Figure 3:
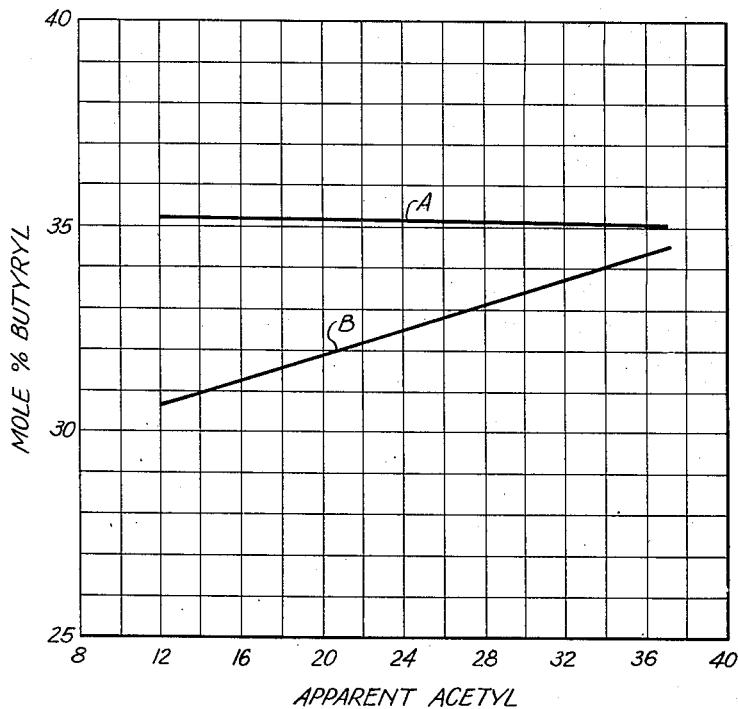

Dec. 6, 1949    C. J. MALM    2,490,643
CONTINUOUS METHOD FOR PREPARING CELLULOSE ESTERS
HAVING A HIGH PROPIONYL AND BUTYRYL CONTENT
Filed June 28, 1946    2 Sheets-Sheet 1
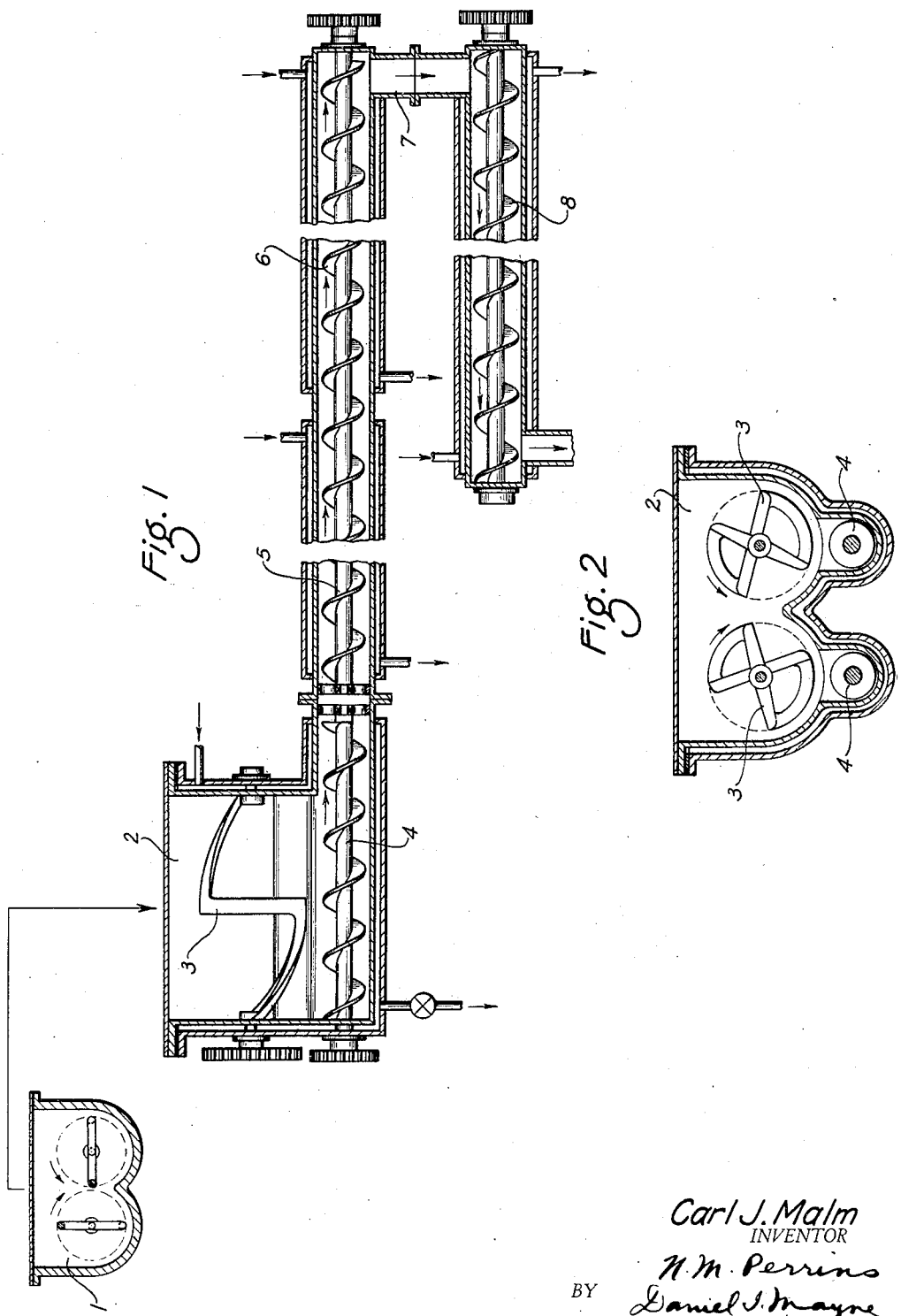
Carl J. Malm
INVENTOR
N. M. Perrins
BY Daniel J. Mayne
ATTORNEYS Dec. 6, 1949 C. J. MALM 2,490,643
CONTINUOUS METHOD FOR PREPARING CELLULOSE ESTERS
HAVING A HIGH PROPIONYL AND BUTYRYL CONTENT
Filed June 28, 1946 2 Sheets-Sheet 2

Carl J. Malm
INVENTOR
N. M. Perrins
BY Daniel J. Mayne
ATTORNEYS

Patented Dec. 6, 1949

UNITED STATES PATENT OFFICE 2,490,643

CONTINUOUS METHOD FOR PREPARING CELLULOSE ESTERS HAVING A HIGH PROPIONYL AND BUTYRYL CONTENT

Carl J. Malm, Rochester, N. Y., assignor to Eastman Kodak Company, Rochester, N. Y., a corporation of New Jersey Application June 28, 1946, Serial No. 679,892

4 Claims. (Cl. 260—227)

This invention relates to a continuous method of preparing cellulose esters having a propionyl and/or butyryl content of at least 20% in which cellulose is thoroughly mixed with the liquid to react therewith and chilled so as to inhibit its esterification until it is fed into the continuous portion of the esterifying apparatus.

Methods for the continuous esterification of cellulose have previously been suggested. These methods ordinarily are of either of two types, i. e. either the cellulose is led in strip form through an esterifying apparatus in which the cellulose is esterified the conditions being such that the cellulose will not dissolve, or the cellulose is passed through a column or cylinder in which a considerable amount of liquid is present, whereby the cellulose is esterified and dissolves to form a viscous dope or gum. The processes of fibrous esterification in which the cellulose is not dissolved have never been used commercially, due primarily to the fact that the esterification of the cellulose results in a fully esterified product which later has to be dissolved in order to obtain a uniform hydrolysis.

One object of my invention is to provide a continuous process for the preparation of cellulose esters having a propionyl or butyryl content of at least 20%. Another object of my invention is to provide a continuous process for the esterification of cellulose in which thorough mixture of the cellulose and the reacting ingredients is assured before the esterification is begun. Another object of my invention is to provide a process of making cellulose esters in which a uniform butyryl (or propionyl) content is imparted to the cellulose. A still further object of my invention is to provide an esterification method in which the materials fed into the reaction chamber are evenly distributed. Other objects of my invention will appear herein.

I have found that these objects can be accomplished if the high butyryl or high propionyl ester is made using such low proportions of liquid to cellulose that all of the liquid employed is absorbed by the cellulose and no liquid phase is apparent. I have found that if the ingredients of such an esterification mixture are mixed and kept at a sufficiently low temperature, they can be held for several hours without any chemical reaction or breakdown of the cellulose viscosity taking place. I have found that because of this fact the cellulose mixed with the reaction liquids can be held in readiness and continuously fed to the esterifying chamber in which it is moved along for the proper time and at the desired speed to obtain a completely esterified product.

In its broadest aspects my invention comprises the contacting of the cellulose with the reaction ingredients under cool conditions, whereby the anhydride does not react upon the cellulose until the time desired and yet no depolymerization of the cellulose occurs, whereupon the mixture is held or maintained at a temperature such that good esterification is obtained. I have found that a process in accordance with my invention can only be carried out in making esters having butyryl and propionyl contents of at least 20%, which esters necessitate the use of butyric or propionic anhydrides. When acetic anhydride is depended upon solely for the esterification, these low temperatures will not inhibit the reaction and, in case these lower temperatures are used, solidification of the acetic acid which may be present therein may result unless both the acetic anhydride and acetic acid are diluted with considerable quantities of propionyl or butyryl compounds.

My invention is directed to those esterification processes in which butyric anhydride or propionic anhydride, or both, are depended upon to promote the esterification, either entirely, or in great measure (at least 50%). When a low liquid-to-solid ratio is used, which is necessary for this process, for instance, in the making of cellulose acetate butyrate having a butyryl content of approximately 37%, butyric anhydride is the sole anhydride usually employed. In the making of cellulose acetate butyrates having a butyryl content of approximately 48% or even more, butyric anhydride also in ordinarily the sole anhydride employed. In the making of cellulose acetate butyrates having a butyryl content of 25–30%, butyric anhydride is often the sole anhydride employed, or in cases where acetic anhydride is also used, it is present in a minor proportion. This is also the case in the making of esters of cellulose having a butyryl content of at least 20% in accordance with my invention. In the case of cellulose esters having a propionyl content above 20% with a low liquid-to-cellulose ratio, propionic anhydride makes up a major proportion of the esterifying anhydride used. My invention is applicable to the making of the various organic acid esters of cellulose having a content of at least 20% of fatty acid groups of 3–4 carbon atoms.

In the attached drawings Figure 1 is a plan view of an apparatus adapted for the carrying out of cellulose esterification processes in accordance with my invention. Figure 2 is an end view of mixer 2, and Figure 3 is a graph illustrating the advantage of a process carried out at a uniformly elevated temperature over processes in which the temperature is held low in the first part of the esterification because of the necessary temperature control in the usual types of esterification processes.

A process in accordance with my invention will be described along with the apparatus which forms the subject of the drawings. The cellulose is placed in a sigma-bladed mixer 1 where it is pretreated with acetic acid with or without a catalyst, following which the esterifying anhydride is added and the mixture is cooled below 10° F. whereupon the main part of the catalyst is mixed with the mass. Due to the fact that the esterifying anhydride is principally propionic or butyric, reaction does not take place at this low temperature. After the mixer has been run until the mixture is uniform, it is dumped into mixer 2 which is also provided with sigma-shaped stirrers 3. It is desirable that the mixer 2 be about twice the size of mixer 1. Mixer 2 is jacketed so that the temperature is kept at approximately 0° F. The mixture is continuously fed into the worm conveyor 4, which conveyor is also jacketed and is kept at a low temperature, such as 0° F. at the mixer and a short distance therefrom. The mixture is then passed by the worm conveyor into reaction chamber 5, which chamber is also jacketed and provided with a worm conveyor. The esterification mixture here is raised to a temperature at which esterification takes place, such as 80 to 100° F., at which temperature the mass is maintained by a proper adjustment of the jacket temperature of the chamber 5. To finish the reaction the mass is moved on through chamber 6 which is also jacketed and which is cooled as the main part of the esterification will take place here. This cooling effect maintains the temperature of the mass at about 80 to 100° F. After the reaction loses its vigor, the mass is then moved on through a worm conveyor chamber 8 wherein the temperature continues to be regulated by means of a jacket. A viscous dope forms and the reaction is completed in chamber 8 so as to reduce the amount of fiber in the dope to a minimum. The speed at which the worm conveyor is operated depends upon the length of the apparatus and upon the desired viscosity of the esterification dope. Conversely the length of apparatus necessary depends upon the speed at which the conveyor is operated. For instance, if the conveyor is operated at a speed that it moves the mass along at the rate of 2 feet per minute and the temperature is regulated so that a four-hour reaction takes place, it is desirable that the chamber 6 be 400 feet long. The chamber 5 need only be a short length sufficient to get the reaction started. Here again, however, the speed at which the mass is moving through governs the length of the chamber. If the dope is being moved through the apparatus at the rate of 5 feet per minute, it is, of course, necessary that the chamber 6 be much longer, or approximately 1200 feet in length. It is to be understood that chamber 6 may be broken up into several units and that chamber 8 may be considered as one of those units, particularly if chamber 8 is long enough to contribute materially to the length needed for the reaction to go to completion. However, if a larger proportion of catalyst is employed, such that the reaction time is to be only two hours, the length of the worm conveyor used need be only half of the figure given above, depending upon the various conditions present.

In the cooling operation at the beginning of the process the degree of cooling depends upon the ratio of acetic anhydride to butyric anhydride in the reactants used and the amount of catalyst present. If butyric anhydride is depended upon entirely, a temperature of less than 40° F. is usually sufficient. If, on the other hand, a substantial proportion of the more active acetic anhydride is present, it is necessary to use more severe cooling, such as even down to 0° F. or −10° F. to prevent reaction between the reacting ingredients and the cellulose prior to introduction of the mass into the worm conveyor and prior to the introduction of the mass to the esterification chamber. In the operation of my process it is desirable to keep the mass during the esterification operation at a fairly uniform temperature. As excellent temperature control is possible by my arrangement of apparatus, this may be done handily. In my process the proportion of liquid to cellulose should be within the range of 4¼ to 1 to 5½ to 1, or, in other words, so that no liquid phase is noticeable. The ratio of approximately 5:1 liquid to cellulose has been found to be particularly useful. The ingredients of the esterification mixture are mixed and kept at a temperature sufficiently low that they can be held for several hours, if desired, without any chemical reaction or viscosity break-down of the cellulose taking place. In this way there is always a supply of potential esterification mixture available for introduction into the worm conveyor.

If desired, the cellulose may be pretreated in any manner which imparts the desired activation to the cellulose. For instance, the cellulose may be pretreated by mixing therewith acetic acid and sulfuric acid in mixer 1, for instance, to 100° F. for one hour. If desired, however, the cellulose may be pretreated by moistening and then displacing the moisture therein with acetic acid and with acetic acid and sulfuric acid as described and claimed in Richter and MacClaren application, Serial No. 657,346. If desired, the cellulose may be activated by dampening and dehydrating as described in Richter and Hincke application, Serial No. 609,044. If the cellulose is activated by treating in sheet form, it is of course desirable to tear the fibers apart prior to mixing with anhydride, cooling, and mixing with catalyst in accordance with my invention. Under the above-described conditions, the sulfuric acid in the esterification mixture is not converted to sulfobutyric or sulfoacetic acid, and the cuprammonium viscosity of the cellulose does not change over a period of several hours. This is shown by the following table, giving the results from mixing the ingredients and keeping for six hours at 10° F., accompanied by the removal of samples at intervals and analyzing them:

| Time, hrs. | Unconverted sulfuric acid | 2½% cuprammonium viscosity |
|---|---|---|
| | Percent | |
| ½ | .132 | 45 |
| 2 | .135 | 41 |
| 4 | .129 | 49 |
| 6 | .132 | 49 |

The results of this series of tests show that the sulfuric acid content and the cuprammonium viscosity of the cellulose remain constant within the accuracy of the analytical methods used. If sulfuric acid is mixed with the cellulose prior to the adding of the anhydride thereto, it should be in small proportion so as to avoid esterification prior to the cooling of the mass.

After the cellulose is completely esterified, it is delivered from the end of the conveyor system at which point it may be mixed with dilute acetic acid and hydrolyzed either continuously or in the usual manner for treating cellulose esters. If a nearly fully esterified ester is desired, it may be treated only for a sufficient time to impart good stability to the cellulose ester.

Figure 3 of the drawings is a graph illustrating the superiority of a process in accordance with my invention in which a high temperature is maintained uniformly throughout the esterification, over a normal esterification process as used ordinarily in batch methods. The curves are formed by plotting the apparent acetyl percentages of the esters (all the acyl figured as acetyl) against the mole percent of butyryl in the total acyl content of the ester. The curve A is the result of carrying out an esterification reaction in which the temperature was maintained uniformly at 100° F. throughout the esterification. Curve B is the result of an esterification process in accordance with normal procedure where the esterification is started at a lower temperature and the temperature is slowly raised throughout the esterification. This graph illustrates that acetic anhydride is much more active at low temperatures than butyric anhydride, hence the butyryl content suffers by comparison, in processes at lowered temperatures in which both acetic anhydride and butyric anhydride are used.

The following example illustrates the production of cellulose esters in accordance with my invention:

Six-hundred pounds of cotton linters were mixed with 475 pounds of acetic acid and 200 cc. of sulfuric acid in a jacketed sigma blade mixer, and the mixer was kept at 100° F. for one hour. Cooling thereof was started by running cooling liquid having a temperature of 0° F. through the jacket of the mixer and 2400 pounds of cooled butyric anhydride were added and thoroughly mixed into the mass. When the mixture was cooled below 10° F., a mixture of 17 pounds of sulfuric acid and 20 pounds of acetic acid was added and thoroughly stirred into the mass. After thorough mixing the mixture having a solid form, the liquid having been absorbed, was dumped into a jacketed, larger size mixer in which the reduced temperature was maintained. A new batch was started in the first mixer while the mixture in mixer No. 2 was continuously fed into a worm conveyor system. The worm conveyor was jacketed and at a short distance from the mixer, the temperature of the mass was raised to 100° F., at which temperature it was kept by means of jacketed tubes in which the worm conveyor operated. A short portion of tube was kept at 100° F. to start the esterification, and the jacket of the principal length of tube was kept at 30° F. to keep the temperature of the reacting mass at 100° F. A viscous dope was formed, which dope was discharged from the tube, mixed with aqueous acid, and hydrolyzed.

My invention also includes other methods of moving the reacting mass along in a jacketed tube than by means of a worm conveyor. However, as the worm conveyor is a practical means for moving the mass, this method of moving the material along is preferred. It is also desirable in esterifying in accordance with my invention that the tube in which the esterification is carried out be of comparatively small cross section as it is important that good temperature control be maintained at all times. I have found it desirable that the tube through which the mass is moved be no more than 10 inches in diameter and preferably 6 inches or less to obtain the desired results. My invention is adapted to the esterification of both cotton linters and woodpulp cellulose, it being preferred that the cellulose which is mixed with the anhydride and introduced into the elongated esterification chamber be in a readily, reactive state and in a form in which uniform mixing of the cellulose fibers and the esterification liquid is possible.

I claim:

1. A method for continuously preparing lower fatty acid esters of cellulose having a content of at least 20% of fatty acid radicles of 3-4 carbon atoms, which comprises mixing cellulose in activated condition with anhydride of a fatty acid of 3-4 carbon atoms and acylation catalyst in such proportion that the liquid-to-cellulose ratio is 4¼ to 5½:1 and cooling the mass to a temperature of less than 10° F. to prevent esterification of the cellulose and reduction of its viscosity, introducing the so-mixed mass into an elongated tube wherein it is moved along and maintained at 80-100° F. until the cellulose is substantially completely esterified.

2. A method for continuously preparing butyric acid esters of cellulose having a butyryl content of at least 20% which comprises mixing cellulose in activated condition with butyric anhydride and sulfuric acid catalyst in such proportion that the liquid-to-cellulose ratio is 4¼ to 5½:1 and cooling the mass to a temperature of less than 10° F. to prevent esterification of the cellulose and reduction of its viscosity, introducing the so-mixed mass into an elongated tube wherein it is moved along and maintained at 80-100° F. until the cellulose is substantially completely esterified.

3. A method for continuously preparing propionic acid esters of cellulose having a propionyl content of at least 20% which comprises mixing cellulose in activated condition with propionic anhydride and sulfuric acid catalyst in such proportion that the liquid-to-cellulose ratio is 4¼ to 5½:1 and cooling the mass to a temperature of less than 10° F. to prevent esterification of the cellulose and reduction of its viscosity, introducing the so-mixed mass into an elongated tube wherein it is moved along and maintained at 80-100° F. until the cellulose is substantially completely esterified.

4. A method for continuously preparing butyric acid esters of cellulose having a butyryl content of at least 20% which comprises mixing cellulose in activated condition with butyric anhydride and sulfuric acid catalyst in a liquid-to-cellulose ratio of 5:1 and cooling the mass to a temperature of less than 10° F. to prevent esterification of the cellulose and reduction of its viscosity, introducing the so-mixed mass into an elongated tube wherein it is moved along and maintained at 80-100° F. until the cellulose is substantially completely esterified.

CARL J. MALM.

REFERENCES CITED

The following references are of record in the file of this patent:

UNITED STATES PATENTS

| Number | Name | Date |
|---|---|---|
| 1,859,579 | Bidaud | May 24, 1932 |
| 2,342,415 | Malm (2) | Feb. 22, 1944 |
| 2,345,406 | Malm | Mar. 28, 1944 |
| 2,355,712 | Dreyfus | Aug. 15, 1944 |
| 2,362,576 | Malm (1) | Nov. 14, 1944 |
| 2,379,310 | Malm et al. (1) | June 26, 1945 |